United States Patent Office.

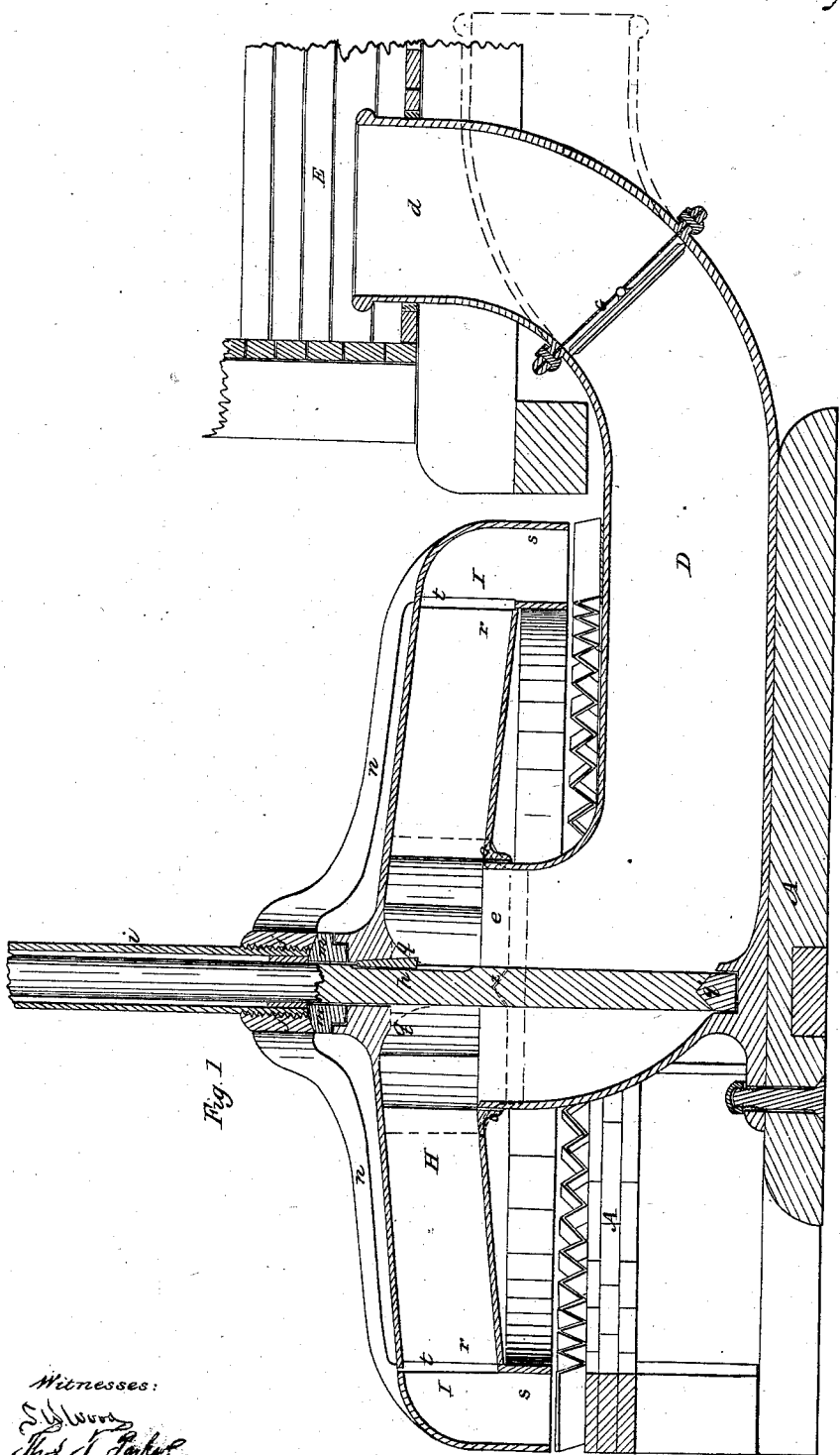
Browne & Hoyt,
Water Wheel,
No. 68,039. Patented Aug. 27, 1867.

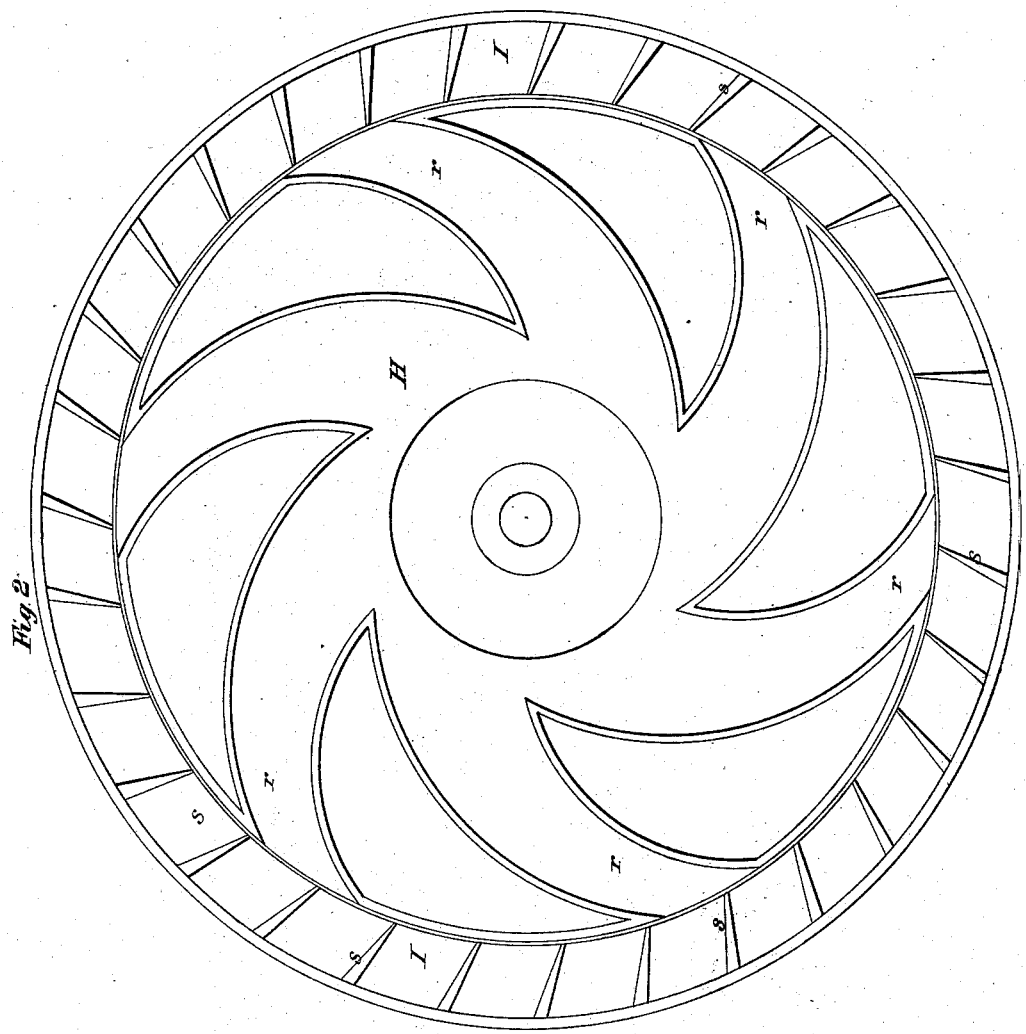

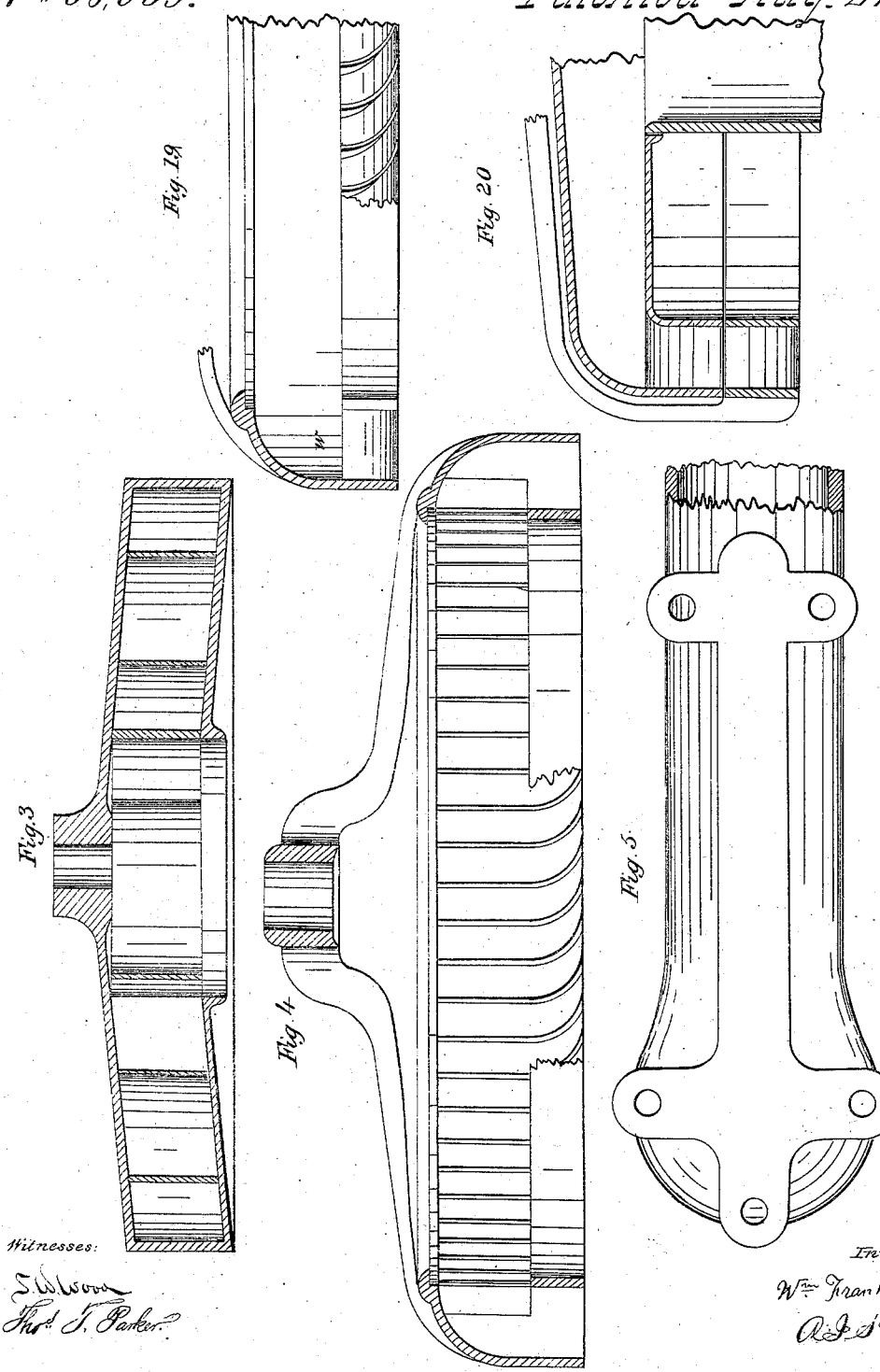

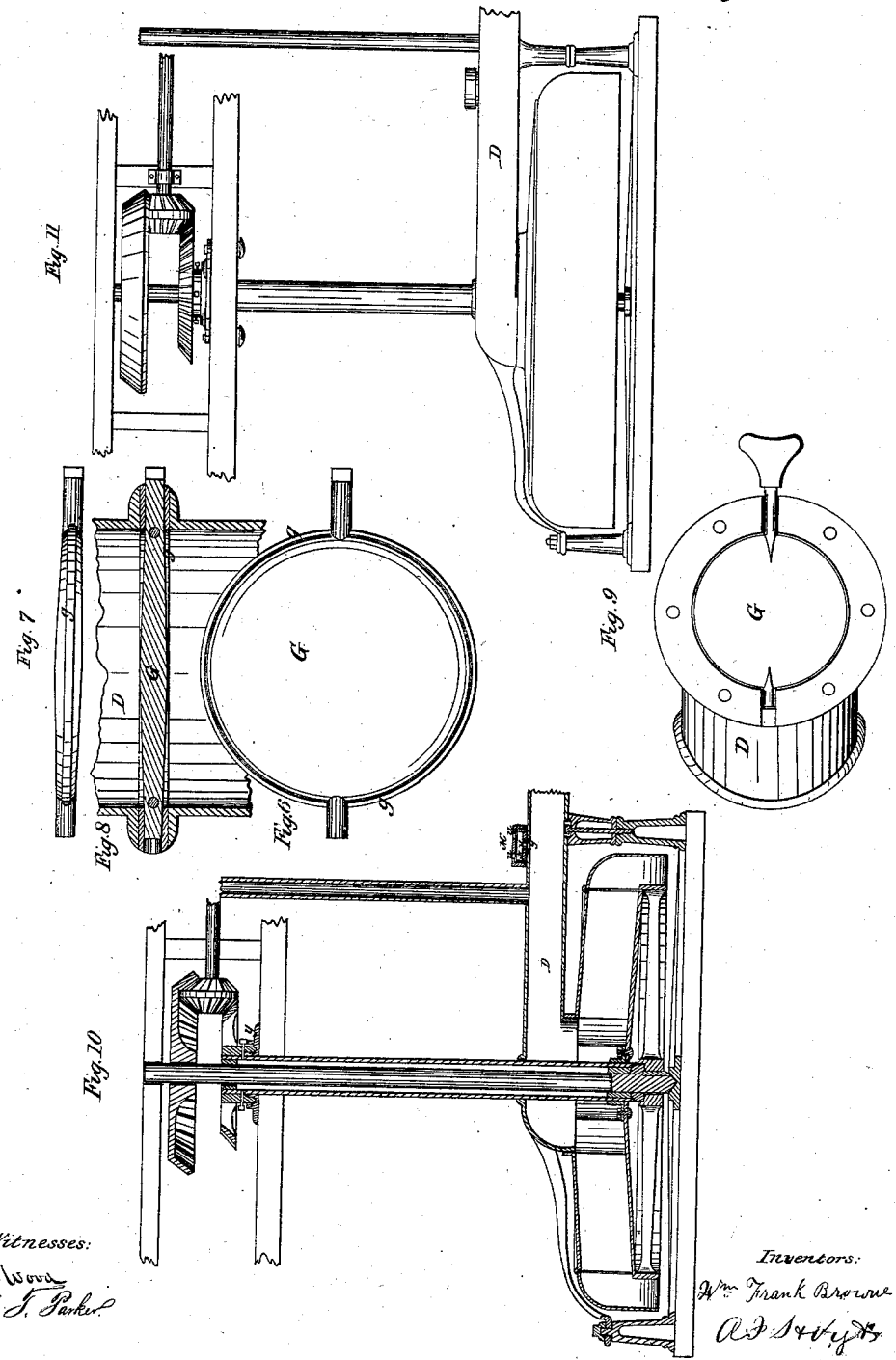

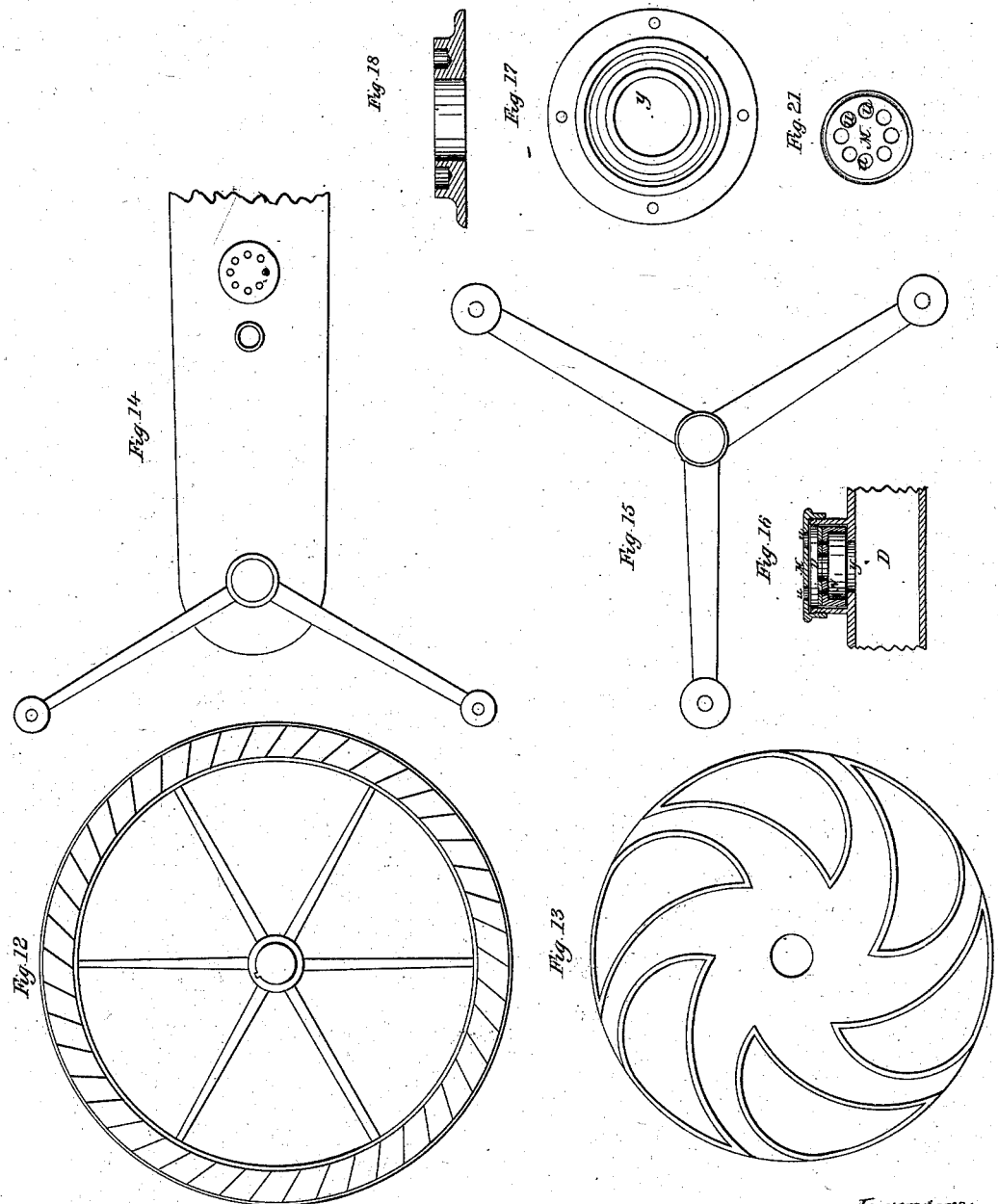

WILLIAM F. BROWNE AND ANDREW J. HOYT, OF WASHINGTON, DISTRICT OF COLUMBIA.

Letters Patent No. 68,039, dated August 27, 1867.

IMPROVEMENT IN WATER-WHEELS.

The Schedule referred to in these Letters Patent and making part of the same.

TO ALL WHOM IT MAY CONCERN:

Be it known that we, WM. F. BROWNE and A. J. HOYT, of Washington, in the county of Washington, and District of Columbia, have invented a new and useful Improvement in Water-Wheels; and we do hereby declare that the following is a full and exact description thereof, reference being had to the annexed drawings, making part of this specification.

Figure 1 represents a central vertical longitudinal section of the combined wheel complete, and the induction pipe.

Figure 2 is a plan of the wheel, showing the position of the buckets in red lines.

Figure 3 is a vertical section of the inner wheel.

Figure 4, a like section of the outer wheel.

Figure 5, a bottom view of the induction pipe, showing one method of securing it in position.

Figures 6, 7, 8, and 9 are detached views of the gate, to regulate the flow of water in the induction pipe.

Figures 10, 11, 12, 13, 14, 15, 16, 17, 18, 19, and 20 are views of various modifications of our improved wheel, the main features of which are represented in figs. 1 and 2.

Like letters designate corresponding parts in all of the figures.

Let A, in the annexed drawings, represent a frame or bed-timber, upon which the wheel is mounted. Upon this is secured the induction pipe D, curving down under, and having one end, $e$, communicating with the centre of the wheel underneath. The other end, $d$, communicates with the flume E. This sub-induction pipe D may extend in a horizontal line, or in other directions, straight or curved, to any distance. The induction pipe is closed by a valve or gate, G, located in any suitable position therein. The construction and operation of the valve are most clearly indicated in figs. 6, 7, 8, and 9. It may have a packing, $g$, of India rubber or other soft material around its edge, grooved to receive the same.

The leading feature of our invention consists in the employment of two wheels, H and I, each of a special kind or construction, the latter being situated closely around the periphery of the former, discharging downward below it, and revolving in the opposite direction. The inner wheel H is a centrifugal or reaction-wheel, provided with curved or other suitably-shaped vent-passages or arms, $r\ r$, so as to deliver the water at the periphery nearly in a tangential direction, but somewhat eccentric, so as to direct the water into the buckets of the outer wheel. The outer wheel I, is provided with buckets, $s\ s$, which at the bottom curve downward and backward in relation to the motion of the wheel, so as to finally deliver the water through sluice-openings in the under side thereof. The upper edges of the buckets are somewhat oblique to the radius, as shown in fig. 2, so as to allow the water from the inner wheel to impinge directly thereon. The sluice or discharge-openings are so determined in size, in relation to the capacity of the induction pipe, as to keep the outer wheel continually filled with water, as well as the inner wheel, in order to get the full effect not only of the momentum, but of the direct pressure of the water and of its reaction in the final discharge. The outer periphery of this outer wheel may be closed by a plate, which curves over and forms a continuation of the upper plate which closes the top of the wheel, or there may be simple arms, $n\ n$, as shown in the drawings. The close top does not allow the water to leak out and waste at the top. The inner wheel H also is closed at the top, and its upper rim should fit close to but not in actual contact with the upper rim or plate of the outer wheel. The bottom plate of the inner wheel should fit closely to the inner rim of the outer wheel, which projects downwards below the former. In the interior there should be some space, $t$, between the buckets of the outer wheel and the side plates of the ducts or passages of the inner wheel, so that there may be room to supply water for keeping the buckets of the outer wheel filled when not passing directly opposite to the adjutages of the inner wheel; or the passages of the latter are so shaped as to deliver water all around the periphery of the wheel. The number of these ducts or passages may vary to more or less than six, as shown. The inner wheel H is secured to a shaft, $h$, which rests on a conical step at the top of induction pipe, as shown by red lines at $l$, fig. 1, or a step at the bottom of the induction pipe, as shown at $q'$ in the same figure. Preferably there should be a curved point or conical projection extending centrally down from the top plate of the inner wheel around its shaft, as shown by red lines $q$ in fig. 1, so as to direct the water outward as smoothly and directly as possible, and a corresponding curve or flaring outward of the induction pipe where it empties into the wheel, as indicated by the red lines at $o$ in the same figure. The shaft $i$ of the outer wheel is tubular, and fits around the shaft $h$ of the inner wheel, as shown in fig. 1. It rests on a step or washer, $m$, of lignumvitæ, or other suitable material, which also is seated in a recess in the top plate of the inner wheel. This tubular shaft may be secured to the arms or upper plate of the outer wheel by a screw-thread, $j$, or otherwise. The motion of the outer wheel may be communicated from its shaft $i$ to the shaft $h$ of the inner wheel by gearing, which is so proportioned as to allow the proper relative velocities to the two wheels, the outer wheel revolving more slowly than the inner wheel. It is not essential that this proportion should be strictly followed, as either wheel may help the other to some extent. Or the power of the outer wheel might be applied to do different work from that of the inner wheel. By these two wheels, combined in their action, we produce a compound wheel which is very effective, since all the remaining force of the water on leaving the inner wheel is received by the outer wheel, and as much power is thus saved as can be obtained, the only drawback being the additional friction of the outer wheel. Essential features of the outer wheel I, in connection with an inner wheel, H, are, that it shall discharge downward and backward, and that it shall be kept filled with water, in order that we may obtain the full force of the pressure of the water in the wheel, and secure the benefit of the reaction in the final discharge. We are not aware that any outer wheel, acting in connection with an inner wheel possessing this feature, has ever been constructed. An open outer wheel, which merely receives the momentum of the water, and allows it to escape loosely from its buckets, can not possess the power which ours possesses in these particulars. As connected with this essential construction of the outer wheel, it is also essential that the buckets of the outer wheel should extend below the buckets of the inner wheel, otherwise there could be no movement downward, and the consequent pressure and reaction of the water as desired. Each wheel, of its kind, may be constructed in the best manner, and thus singly each is fully effective. Hence we obtain a high percentage of power from the water. The additional expense of the outer wheel is more than counterbalanced by our dispensing with forebays and inclosing cases, the wheels themselves fulfilling the purpose of retaining and directing the water. The advantage of the sub-induction pipe D in connection with these wheels consists in employing the pressure of the water to lift and sustain the wheels, thus greatly lessening the friction of the wheels and the wear of their shafts upon the steps. In fact this upward pressure may more than counterbalance the weight of the wheels and their shafts, and if it greatly exceeds the same, a counter-weight in the form of a balance-wheel may be applied to the shaft $h$ of the inner wheel, or even to the tubular shaft $i$, though not so advantageously. The induction pipe may lead the water into the top of the inner wheel, as indicated by the modification shown in figs. 10 and 11. The wheel in other respects may be the same as described with a sub-induction pipe. But this, of course, lacks the advantages of the lifting of the wheels, to save friction and wear. Fig. 19 shows a modification, in which the buckets of the outer wheel are placed below instead of around the periphery of the inner wheel. In this case the water enters an unencumbered space, $w$, in the outer wheel, above the buckets thereof. Fig. 20 shows another modification, in which the outer wheel is entirely under the inner wheel, the adjutages of which are directed downward instead of outward. As the induction pipe is liable to collapse below the valve or gate, or between it and the wheel (when closed suddenly) by the momentum of the flowing water, we employ a valve, represented in figs. 10 and 16, for admitting air automatically, and thus obviating any damage from that cause. There is a valve-case and seat, M, on the induction pipe D, and a sliding-valve, N, therein. The interior of the valve-case communicates with the interior of the pipe by an opening, $x$. There are openings, $u\ u$, in the top of the valve-case, to be closed by the valve when the latter is pressed upward against the case, and an opening or openings, $v$, in the valve, not opposite to the openings $u\ u$. When the water is flowing through the pipe its pressure upward keeps the valve closed, so that no water escapes thereby; but as soon as the pressure of the water ceases, the valve drops and air rushes in at once and relieves the tendency to collapse. Any equivalent construction of valve may be employed. In order that the induction pipe may be placed in different positions or directions, according to circumstances, we have an improved coupling-joint, as indicated in fig. 1. The pipe is curved to an angle with the body thereof, and the contiguous piece may be the same, so that if the two curves are joined, as shown by blue lines, the two parts will be at right angles, or approximate thereto, but by turning one pipe half-way round, as indicated by red lines, the two will extend in the same direction, or approximate thereto, while there will be a bend in the pipe. The two parts may be connected by flanches and bolts, as shown, arranged to suit the purpose.

What we claim as our invention, and desire to secure by Letters Patent, is—

The combination of an inner centrifugal or reaction-wheel, H, and an outer wheel, I, which discharges downward and below the inner wheel through buckets $s\ s$ that curve downward and backward, and the discharge-apertures of which are of such size as to keep the wheel filled with the water, substantially as and for the purpose herein specified.

We also claim a valve, N, arranged in the induction pipe D, between the valve or gate and the wheel, and operating substantially as and for the purpose herein set forth.

WM. F. BROWNE,
A. J. HOYT.

Witnesses:
J. S. BROWN,
S. W. WOOD.